United States Patent
Xu et al.

(10) Patent No.: US 8,831,150 B1
(45) Date of Patent: Sep. 9, 2014

(54) METHOD AND APPARATUS FOR DETECTING A PREAMBLE IN A RECEIVED SIGNAL

(71) Applicant: Hong Kong Applied Science and Technology Research Institute Company Limited, Hong Kong (HK)

(72) Inventors: Jun Xu, Hong Kong (HK); Man Wai Kwan, Hong Kong (HK); Honglei Zhang, Hong Kong (HK); Peng Li, Hong Kong (HK); Kong Chau Tsang, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 0 days.

(21) Appl. No.: 13/935,568

(22) Filed: Jul. 5, 2013

(51) Int. Cl.
  *H04L 27/06* (2006.01)
  *H04B 1/10* (2006.01)
  *H04L 25/03* (2006.01)
  *H04L 1/00* (2006.01)

(52) U.S. Cl.
  CPC ........ *H04L 25/03821* (2013.01); *H04L 1/0083* (2013.01)
  USPC ............................. 375/342; 375/343; 375/350

(58) Field of Classification Search
  CPC ............ H04L 27/2637; H04L 25/0202; H04L 27/2601; H04L 27/2697; H04B 7/0697; H04J 13/10; H04J 13/18; H04J 14/0298; H04W 56/00; H04W 74/0866
  USPC ........................... 375/260, 340, 342, 343, 350
  See application file for complete search history.

(56) References Cited

U.S. PATENT DOCUMENTS

| 8,290,076 | B2 | 10/2012 | Kameya | |
| 2005/0030919 | A1* | 2/2005 | Lucidarme et al. | 370/328 |
| 2006/0153283 | A1* | 7/2006 | Scharf et al. | 375/148 |
| 2009/0225908 | A1 | 9/2009 | Masuda | |
| 2010/0150277 | A1 | 6/2010 | Kim | |
| 2010/0158050 | A1 | 6/2010 | Yang | |

FOREIGN PATENT DOCUMENTS

WO  WO2011120255 A1  10/2011

OTHER PUBLICATIONS

Sesia, S., Toufik, I., and Baker, M. (ed.), "LTE, The UMTS Long Term Evolution: From Theory to Practice," John Wiley & Sons, 2009.

* cited by examiner

*Primary Examiner* — Don N Vo
(74) *Attorney, Agent, or Firm* — Elia Cheong Hong Kong; Sam T. Yip

(57) ABSTRACT

This invention discloses a method and an apparatus for reducing false alarm rate in preamble detection due to discontinuities between successive symbols in a received signal. The invention is usable in, e.g., a LTE compliant system. In one embodiment, the apparatus includes a filter for filtering the received signal to yield a filtered signal, and a correlator for correlating the filtered signal with a predetermined preamble. The apparatus further comprises a first multiplier for modifying the received signal before it is filtered, or a second multiplier for modifying the filtered signal before it is correlated, or both. The first multiplier multiplies the received signal with a first time-domain window function configured to substantially smooth discontinuities at symbol boundaries in the received signal. The second multiplier multiplies the filtered signal with a second time-domain window function configured to substantially suppress spikes present in the filtered signal around the symbol boundaries.

19 Claims, 6 Drawing Sheets

METHOD AND APPARATUS FOR DETECTING A PREAMBLE IN A RECEIVED SIGNAL

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to detection of a preamble in a received signal. In particular, the present invention relates to a method and an apparatus for reducing false alarm rate in preamble detection due to discontinuities between successive time-domain symbols in the received signal.

BACKGROUND

In a long-term evolution (LTE) compliant wireless communication system, a physical random access channel (PRACH) is used by a user equipment (UE) to initiate network access by sending a PRACH signal over the PRACH to a base station, known in the LTE literature as an eNodeB (Evolved Node B). The PRACH signal contains a preamble, which is a signature sequence selected from a set of sequences according to the specification of the LTE compliant wireless communication system. Each of such sequences has a unique preamble index. Details regarding the preamble and the preamble index thereof can be found in S. Sesia, I. Toufik and M. Baker (ed.), *LTE, The UMTS Long Term Evolution: From Theory to Practice*, John Wiley & Sons, 2009, the disclosure of which is incorporated by reference in its entirety herein. The base station is required to detect arrival of the PRACH signal by detecting presence or absence of the preamble. Furthermore, the base station is required to determine the preamble index of the preamble and report some measurements to upper layer.

In an uplink of the LTE compliant system, certain subframes are configured with PRACHs, on which PRACH signals sent from UEs can be transmitted. In a subframe having a PRACH, the PRACH is frequency-multiplexed with other uplink channels, namely, physical uplink shared channels (PUSCHs) and physical uplink control channels (PUCCHs), to form an uplink signal. In general, such uplink signal may include: no PRACH signal at all, or one PRACH signal sent from one UE, or a number of PRACH signals sent from multiple UEs; and one or more other-channel signals from other UEs on the PUSCHs and/or the PUCCHs. In particular, these other UEs send the other-channel signals in a time-synchronized manner. However, since different UEs have different distances from the base station, signals sent from these other UEs arrive at the base station with slightly different time delays. Hence, the received uplink signal is such that boundaries of transmitted symbols present in the other-channel signals on the PUSCHs and/or the PUCCHs are approximately time-aligned. To detect presence or absence of a possible preamble signature sequence in the PRACH, the receiver is required to perform such detection in the presence of interference caused by the other-channel signals. The detection problem is further complicated in that a UE prefers to send a PRACH signal with minimal power just sufficient enough for the preamble index carried in the preamble to be detected while UEs send the other-channel signals often with high transmit power levels in order to achieve high throughput (i.e. high spectral efficiency).

An important consideration in processing the uplink signal received by the base station for detecting a preamble signature sequence is to minimize the false alarm rate. While US20100150277 and WO2011120255 address the problems of reducing the false alarm rates due to the effect of multipath dispersion and due to the carrier frequency offset, respectively, it is also evident that minimizing the false alarm rate in the presence of other-channel signals having transmit power higher than that of the PRACH signal has practical applications. Filtering, which is used to extract the PRACH signal from the uplink signal, also reduces power levels of the other-channel signals. However, in some situations using filtering techniques alone is not adequate when the power level of the sum of the other-channel signals is substantially higher than that of the PRACH signal. For example, the difference in the power level may be as high as 35 dB.

It is desirable to have additional techniques that can work with the filtering techniques for further reducing the false alarm rate in the presence of the other-channel signals. There is a need in the art for such additional techniques.

SUMMARY OF THE INVENTION

In a first aspect of the present invention, a method for detecting presence of a preamble in a received signal is provided. The received signal has one or more frequency-multiplexed component signals received over a frequency range, where the frequency range is subdivided into a random access channel and a non-random access channel. Furthermore, the received signal has temporal reference locations such that boundaries of transmitted symbols in the one or more component signals received over the non-random access channel are approximately time-aligned to the temporal reference locations.

The method comprises filtering the received signal so as to obtain a filtered signal comprising a substantial portion of the one or more component signals received over the random access channel without including a substantial portion of the one or more component signals received over the non-random access channel, and correlating the filtered signal with a predetermined preamble to generate a plurality of correlation outputs for detecting presence of the preamble in the filtered signal. The method further comprises pre-processing the received signal before the received signal is filtered, or post-processing the filtered signal after the filtered signal is obtained and before the filtered signal is correlated, or performing both the pre-processing of the received signal and the post-processing of the filtered signal. The pre-processing of the received signal includes modifying the received signal by multiplying the received signal with a first time-domain window function configured to substantially smooth discontinuities present in the received signal at the temporal reference locations. The post-processing of the filtered signal includes modifying the filtered signal by multiplying the filtered signal with a second time-domain window function configured to substantially suppress spikes present in the filtered signal in the neighborhood of the temporal reference locations.

Preferably, the method further includes detecting, among the correlation outputs, one or more peaks above a detection threshold value so as to detect presence of the preamble and to estimate a timing advance of the UE that sent the preamble.

A second aspect of the present invention is to provide an apparatus for preamble detection in the received signal.

The apparatus comprises a filter for filtering the received signal. The filter gives a filtered signal comprising a substantial portion of the one or more component signals received over the random access channel without including a substantial portion of the one or more component signals received over the non-random access channel. A correlator for correlating the filtered signal with a predetermined preamble is further included in the apparatus, generating a plurality of correlation outputs. In addition, the apparatus further comprises a first multiplier for modifying the received signal before the received signal is filtered, or a second multiplier for modifying the filtered signal after the filtered signal is obtained and before the filtered signal is correlated, or both of the first multiplier and the second multiplier. The first multiplier is configured to modify the received signal by multiplying the received signal with a first time-domain window function that is configured to substantially smooth discontinuities present in the received signal at the temporal reference locations. The second multiplier is configured to modify the filtered signal by multiplying the filtered signal with a second time-domain window function that is configured to substantially suppress spikes present in the filtered signal in the neighborhood of the temporal reference locations.

Preferably, the apparatus additionally comprises a peak detector for detecting, among the correlation outputs, one or more peaks above a detection threshold value so as to detect presence of the preamble in the received signal and to estimate a timing advance of a UE that sent the preamble. The filter may include a decimator configured such that subsequent processes can be simplified because of dealing with a smaller number of samples.

The disclosed method and the disclosed apparatus share similar optional features as follows. It is preferable that the first time-domain window function or the second time-domain window function is substantially close to zero at any of the temporal reference locations. The first time-domain window function or the second time-domain window function may have a window shape selected from a rectangular window, a Hamming window, a Kaiser window and a raised cosine window. It is also possible that the first or the second time-domain window function shape may have other window shape. The random access channel may be a PRACH. The non-random access channel may include one or more of PUSCHs and PUCCHs. The transmitted symbols may include SC-FDMA symbols or OFDMA symbols. In the implementation of the disclosed method or the disclosed apparatus, the multiplying of the received signal with the first time-domain window function may be configured such that the received signal is modified by multiplying the received signal with the first time-domain window function if the received signal is inside a plurality of smoothing regions while the received signal is kept unchanged if the received signal is outside the smoothing regions, where each of the smoothing regions is located in the neighborhood of the temporal reference locations. In addition, the multiplying of the filtered signal with the second time-domain window function may be configured such that the filtered signal is modified by multiplying the filtered signal with the second time-domain window function if the filtered signal is inside a plurality of suppression regions while the filtered signal is kept unchanged if the filtered signal is outside the suppression regions, where each of the suppression regions is located in the neighborhood of the temporal reference locations.

DETAILED DESCRIPTION OF THE INVENTION

While the discussion herein in the disclosure is generally directed to a LTE compliant wireless communication system, it is not intended that the invention is only limited to such system. The techniques disclosed herein in the present invention are applicable to any communication system where a received signal thereof has a format that satisfies certain requirements as stated in the disclosure herein.

As used herein in the specification and in the appended claims, a random access channel is a communication channel or a plurality of communication channels on which a preamble signal is transmitted, where the preamble signal contains a preamble that is a signature sequence selected from a set of sequences. An example of the random access channel is a PRACH used in a LTE compliant wireless communication system.

As used herein in the specification and in the appended claims, a non-random access channel is a communication channel that is not a random access channel, or is a plurality of communication channels each of which is not a random access channel. An example of the non-random access channel is a PUSCH and/or a PUCCH employed in a LTE compliant wireless communication system. Another example is an aggregation of a number of individual channels selected from PUSCHs and PUCCHs. A non-random access channel is configured to transmit a non-preamble signal thereon.

For a LTE compliant wireless communication system, as is mentioned above, boundaries of transmitted symbols present in other-channel signals on PUSCHs and/or PUCCHs are approximately time-aligned. For simplicity, these other-channel signals are hereinafter referred to as PUSCH/PUCCH signals. According to the technical specification of the LTE system as published in TS 36.211 V9.1.0, March 2010, by the 3GPP, each of these transmitted symbols is a single-carrier frequency division multiple access (SC-FDMA) symbol. The SC-FDMA symbol is a multiplex of a number of modulation symbols. Furthermore, two successive SC-FDMA symbols are often obtained with different sets of modulation symbols, so that there is often a discontinuity between symbol boundaries of successive SC-FDMA symbols. In the presence of one or more PUSCH/PUCCH signals having high power, the discontinuity between symbol boundaries of the received uplink signal is often more pronounced.

As used herein in the specification and in the appended claims, a first object being "in the neighborhood of" a second object is defined in the sense that the (time) distance between the first object and the second object is substantially shorter than a length of a transmitted symbol in a signal transmitted on a non-random access channel. For example, the symbol can be a SC-FDMA symbol or an OFDMA symbol.

Figure 1:
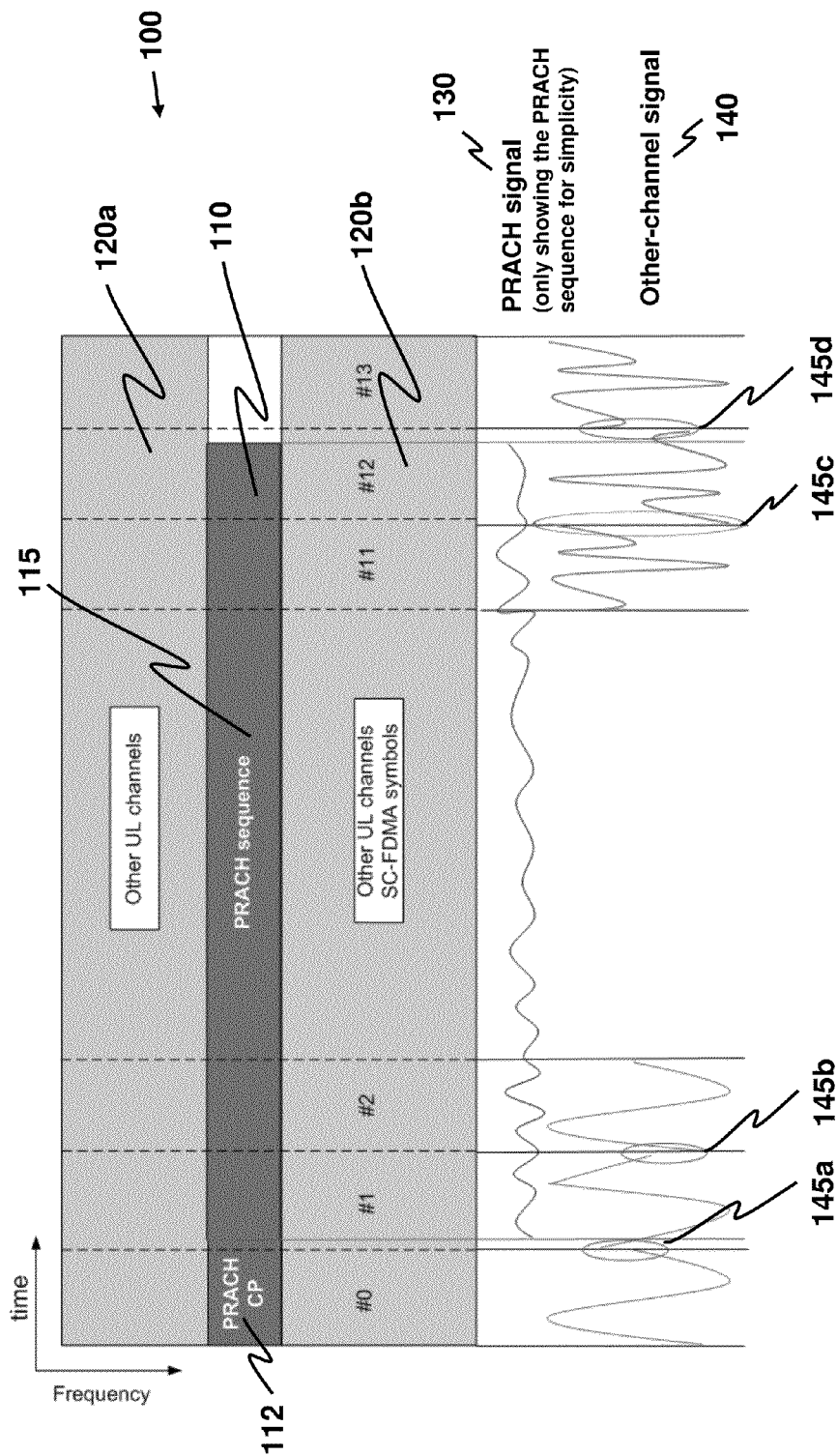
FIG. 1 illustrates occurrence of discontinuities in a received uplink signal at symbol boundaries of other-channel signals.

FIG. 1 illustrates occurrence of discontinuities at symbol boundaries in an uplink signal. An uplink signal 100 is formed by multiplexing signals transmitted on a PRACH 110 and on a plurality of other uplink channels 120a, 120b. The PRACH 110 carries a PRACH signal 130 comprising a PRACH-signal cyclic prefix 112 and a preamble signature sequence 115. As is shown in FIG. 1, the PRACH signal 130 is a substantially smooth signal. An other-channel signal 140 is formed by combining one or more PUSCH/PUCCH signals transmitted on the other uplink channels 120a, 120b. Different from the PRACH signal 130, discontinuities 145a, 145b, 145c and 145d occur exactly at the symbol boundaries of the other-channel signal 140.

Besides SC-FDMA symbols, the inventors observe that discontinuities at boundaries of transmitted symbols also occur if the transmitted symbols are OFDMA symbols. The techniques disclosed herein in the present invention are also applicable for communication systems using OFDMA symbols.

Figure 2:
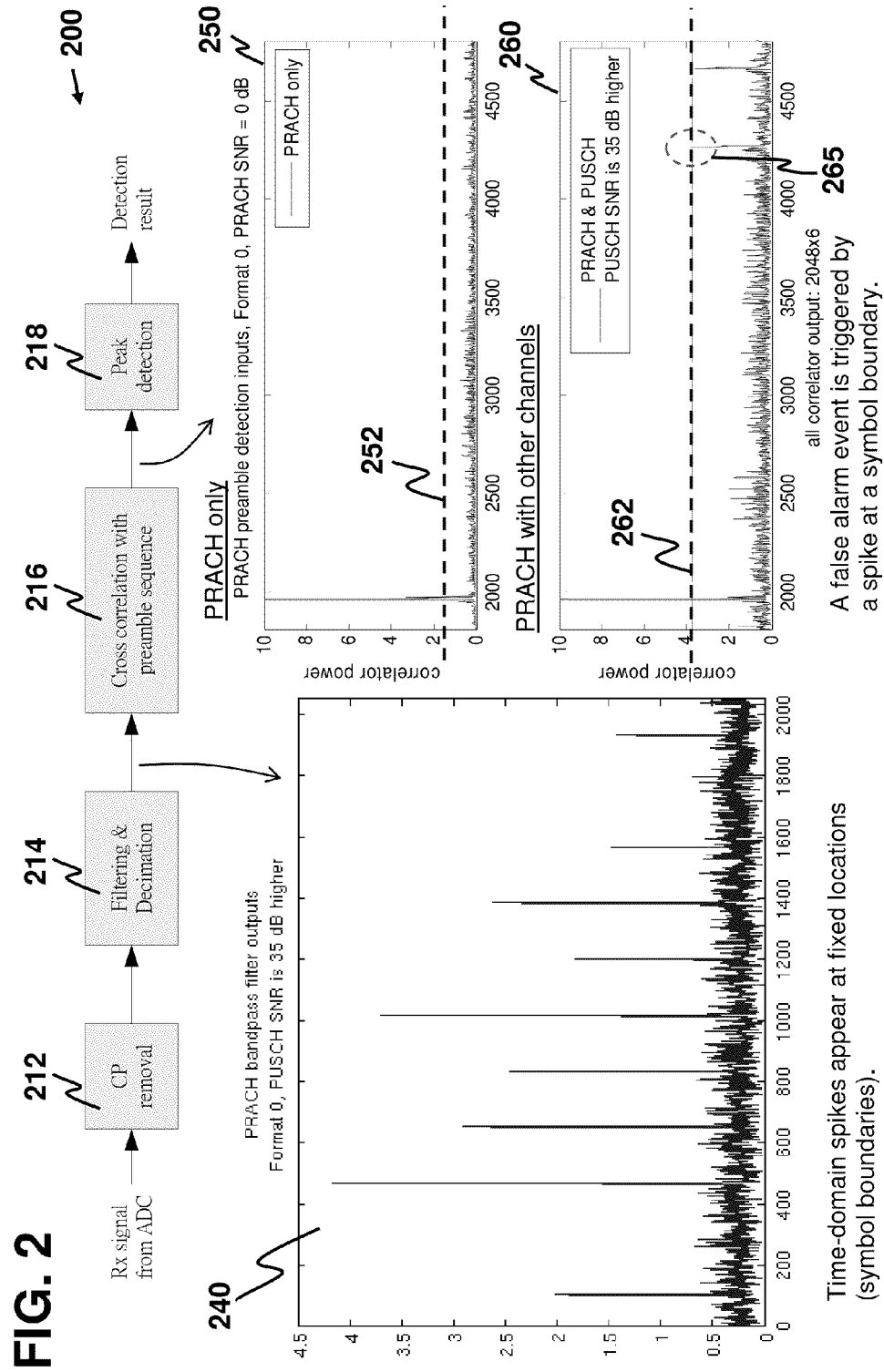
FIG. 2 illustrates occurrence of spikes in the neighborhood of the symbol boundaries after filtering is performed on the received uplink signal, and occurrence of a false alarm event as a result of the presence of the spikes.

FIG. 2 illustrates effects of discontinuities at symbol boundaries in processing the received signal. It is desired to detect a preamble signature sequence in the received signal. The received signal having a PRACH signal therein is processed by a method 200. In a first step 212, a cyclic prefix in the received signal is removed. The resultant signal is then filtered and decimated in a second step 214 in order to extract the PRACH signal, yielding a filtered signal. The filtered signal is processed in a third step 216 by correlating the filtered signal with a pre-determined preamble signature sequence, generating a plurality of correlation results. In a fourth step 218, correlation peaks that exceed a detection threshold value are detected in order to detect presence or absence of the preamble signature sequence. A plot 240 depicts a filtered signal obtained in a simulation run performed by the inventors. In the simulation run, the uplink signal includes a PRACH signal and a plurality of PUSCH/PUCCH signals. The inventors have found that time-domain spikes appear at around the time instants on where symbol boundaries are located. In a plot 250, a first sequence of correlation results obtained in a simulation run is shown, where the received signal contains the PRACH signal only without any other PUSCH/PUCCH signal. A first threshold value 252 is computed based on the average received power level. By comparing such correlation results with the first threshold value 252, a distinct correlation peak can be identified. However, it is different when there are PUSCH/PUCCH signals with significantly higher power levels. A plot 260 shows a second sequence of correlation results obtained in a simulation run where the PUSCH/PUCCH signals are present and the power level of the PUSCH/PUCCH signals is 35 dB greater than the PRACH signal's power level. Again, a second threshold value 262 is computed based on the average received power level. Although the second threshold value 262 is higher than the first threshold value 252, comparing the correlation results in the aforesaid second sequence with the second threshold value 262 still gives rise to a peak 265 that incorrectly identifies presence of a preamble, causing a false alarm event. This result indicates an adverse effect of discontinuities in the presence of high-power PUSCH/PUCCH signals.

The aforementioned observations enable the inventors to develop a first proposition that substantially removing the time-domain spikes in the filtered signal may reduce the power levels of the undesired correlation peaks. Reducing the power levels of the undesired correlation peaks is advantageous for reducing the resultant false alarm rate. Furthermore, the observation that the time-domain spikes occur at the time instants of symbol boundaries provides a second proposition that substantially removing discontinuities of the received signal at these time instants may reduce the magnitudes of the time-domain spikes. The inventors have investigated the first and the second propositions and confirmed both propositions thereafter. Furthermore, the inventors have found that either one of the two techniques developed based on these confirmed propositions can be used alone or both techniques are used together in processing the received signal for reducing occurrence of false alarm events. The inventors' aforementioned findings lead to the present invention that is elaborated as follows.

A first aspect of the present invention is to provide a method for detecting presence of a preamble in a received signal and estimating a timing advance for a UE that sent the preamble. The received signal has one or more frequency-multiplexed component signals received over a frequency range. The frequency range is subdivided into a random access channel and a non-random access channel. The received signal further includes temporal reference locations such that boundaries of transmitted symbols in the one or more component signals received over the non-random access channel are approximately time-aligned to the temporal reference locations.

Although the method disclosed herein is illustrated with a focus on detecting presence of one preamble, an ordinary person skilled in the art can extend the disclosed method for detecting presence of multiple preambles in the received signal according to the teachings disclosed herein.

Take the LTE compliant wireless communication system (whose details on physical channels and modulation are provided in the publication TS 36.211 V9.1.0 mentioned above) as an example. The received signal is an uplink signal received at an eNodeB. The frequency range occupies a bandwidth of 20 MHz. The random access channel is a PRACH. The non-random access channel comprises a plurality of PUSCHs and PUCCHs. The one or more component signals include one or more PUSCH/PUCCH signals, and/or one or more PRACH signals if any. The temporal reference locations are defined for the received signal as the time instants on which boundaries of SC-FDMA symbols in the plurality of PUSCHs are exactly known. The transmitted symbols are SC-FDMA symbols.

Although the LTE communication standard has adopted SC-FDMA symbols for uplinks, the disclosed method is also applicable if the transmitted symbols are OFDMA symbols.

Figure 3:
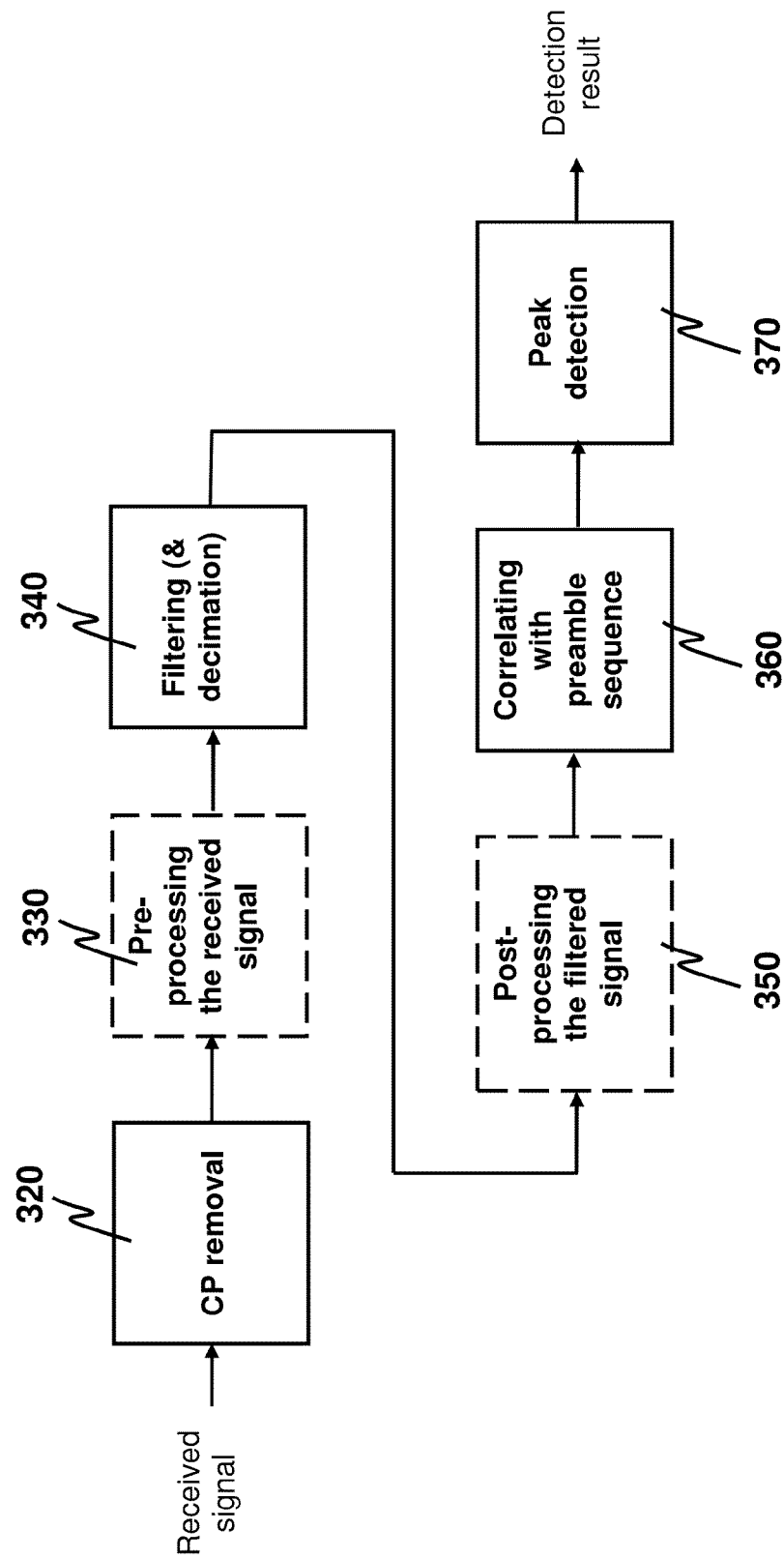
FIG. 3 depicts a method for processing a received uplink signal in accordance with an embodiment of the present invention.

The disclosed method is illustrated as follows with an aid of FIG. 3, which depicts a flowchart of the steps according to an embodiment of the disclosed method.

The method comprises filtering the received signal so as to obtain a filtered signal comprising a substantial portion of the one or more component signals received over the random access channel without including a substantial portion of the one or more component signals received over the non-random access channel, as is shown in a step 340. Generally, digital signal processing is adopted in the art in the implementation of the method disclosed herein, though it is not intended that the disclosed method is limited only to digital implementation. If digital implementation techniques are used, the filtered signal may be decimated, also shown in the step 340, so that the filtered signal has a sampling rate lower than the received signal's sampling rate. Subsequent processing of the filtered signal can be simplified because of dealing with a smaller number of samples. The filtered signal is correlated with a predetermined preamble to generate a plurality of correlation outputs for detecting presence of the preamble in the filtered signal, as is shown in a step 360. Preferably, the presence of the preamble in the filtered signal is detected by detecting, among the correlation outputs, one or more peaks above a detection threshold value, as shown in a step 370. The information provided by the locations of the one or more peaks can be used to estimate a timing advance of a UE that sent the preamble.

The method further comprises pre-processing the received signal before the received signal is filtered (depicted in a step 330), or post-processing the filtered signal after the filtered signal is obtained and before the filtered signal is correlated (depicted in a step 350), or performing both the pre-processing of the received signal (shown in the step 330) and the post-processing of the filtered signal (shown in the step 350). The pre-processing of the received signal includes modifying the received signal by multiplying the received signal with a first time-domain window function that is configured to substantially smooth discontinuities present in the received signal at the temporal reference locations. As used herein, "to substantially smooth a discontinuity" is defined in the sense that the degree of severity of the discontinuity after a smoothing operation is performed is substantially reduced when compared to the degree of severity of the discontinuity before performing the smoothing operation. The degree of severity may be, for example, a difference between a left-hand value and a right-hand value at the discontinuity. The post-processing of the filtered signal includes modifying the filtered signal by multiplying the filtered signal with a second time-domain window function configured to substantially suppress spikes present in the filtered signal in the neighborhood of the temporal reference locations.

Optionally, a cyclic prefix in the received signal is removed, as shown in a step 320, before performing the pre-processing of the received signal in the step 330 or the filtering of the received signal in the step 340. Removing the cyclic prefix has an advantage in digital implementation of the disclosed method in that the number of samples to be processed in the subsequent steps 330, 340 can be reduced.

Preferably, the first time-domain window function is substantially close to zero at any of the temporal reference locations to thereby configure this window function to substantially smooth discontinuities present in the received signal at the temporal reference locations.

Figure 4:
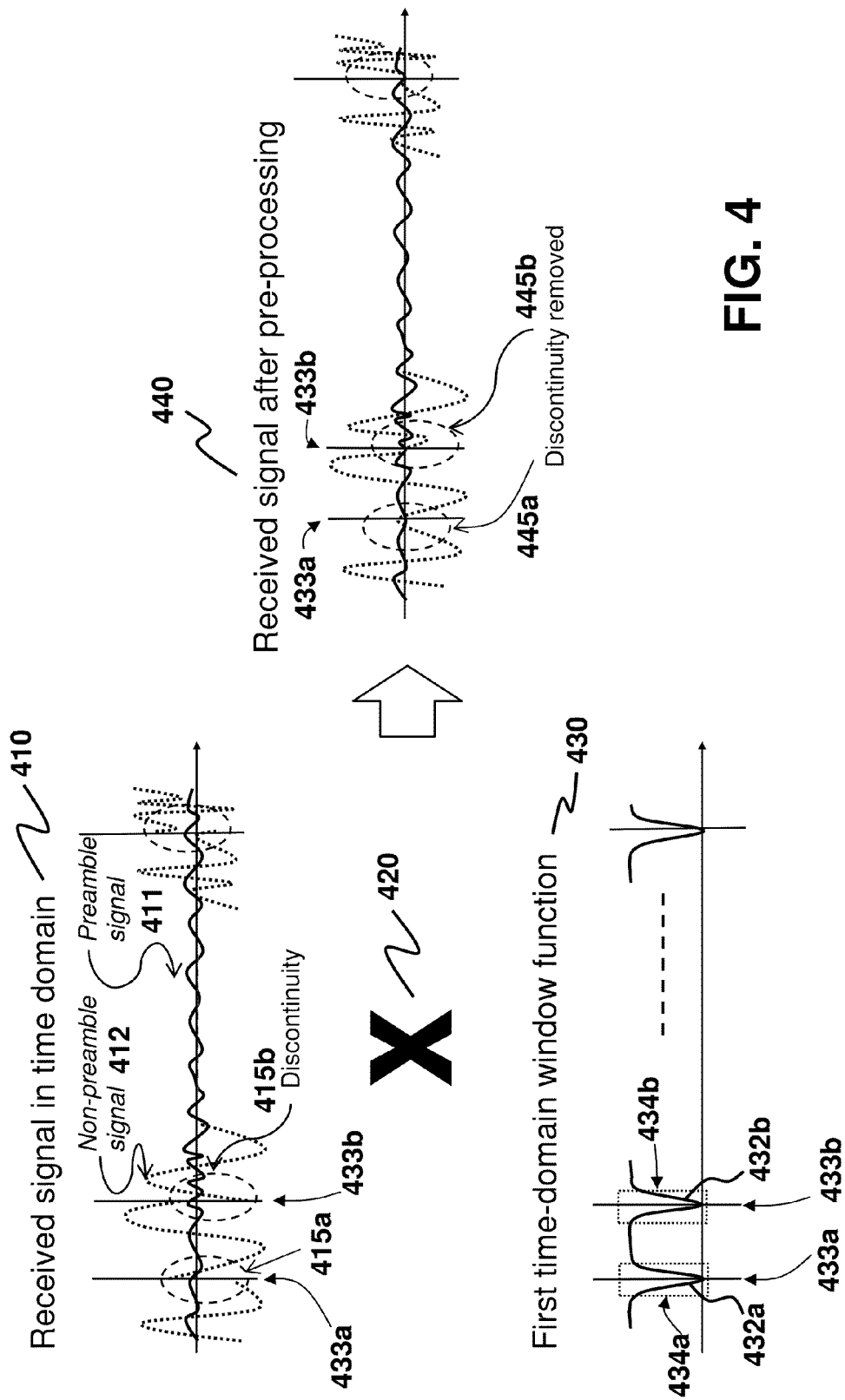
FIG. 4 illustrates, according to an embodiment of the present invention, a smoothing operation on the received signal, where the received signal is multiplied in the time domain with a first time-domain window function in order to smooth out discontinuities at symbol boundaries of the received signal.

An embodiment of the pre-processing of the received signal is illustrated in FIG. 4. A received signal 410 comprises frequency-multiplexed component signals including a preamble signal 411 transmitted on a random access channel, and a non-preamble signal 412 transmitted over a non-random access channel. Note that the non-preamble signal 412 has a number of discontinuities 415a, 415b located at temporal reference locations 433a, 433b, which are the boundaries of transmitted symbols in the non-preamble signal 412. A multiplication operation 420 is performed in order to multiply the received signal 410 and a first time-domain window function 430. The first time-domain window function 430 has a property that its value is substantially close to zero at each of the temporal reference locations. In addition, the first time-domain window function 430 has a plurality of first window shapes 432a, 432b. Each of the first window shapes is used to substantially smooth one discontinuity. For example, the first window shapes 432a and 432b are for substantially smoothing the discontinuities 415a and 415b, respectively. Examples of a first window shape 432a/432b include a rectangular window, a Hamming window, a Kaiser window and a raised cosine window. After the multiplication operation 420 is performed, it yields a modified received signal 440. The modified received signal 440 has the original discontinuities 415a, 415b substantially smoothed, as shown in locations 445a, 445b. The modified received signal 440 is identical to the received signal 410 outside of the smooth regions 434a and 434b. In the implementation of the disclosed method, this configuration is advantageous in that the multiplication operation 420 needs not be executed when the received signal 410 does not fall into any of the smooth regions. Note that the smoothing region 434a is located in the neighborhood of the temporal reference location 433a. Within the time duration of the first window shape 432a, the multiplying of the received signal 410 with the first time-domain window function 430 may be configured such that the received signal 410 is modified by multiplying the received signal 410 with the first window shape 432a if the received signal 410 is inside the smoothing region 434a while the received signal 410 is kept unchanged if the received signal 410 is outside the smoothing region 434a.

Similar to the first time-domain window function, preferably the second time-domain window function is substantially close to zero at any of the temporal reference locations to thereby substantially suppress spikes present in the filtered signal in the neighborhood of the temporal reference locations. It is also preferable that the second time-domain window function has a second window shape. The second window shape may be one of a rectangular window, a Hamming window, a Kaiser window and a raised cosine window.

Figure 5:
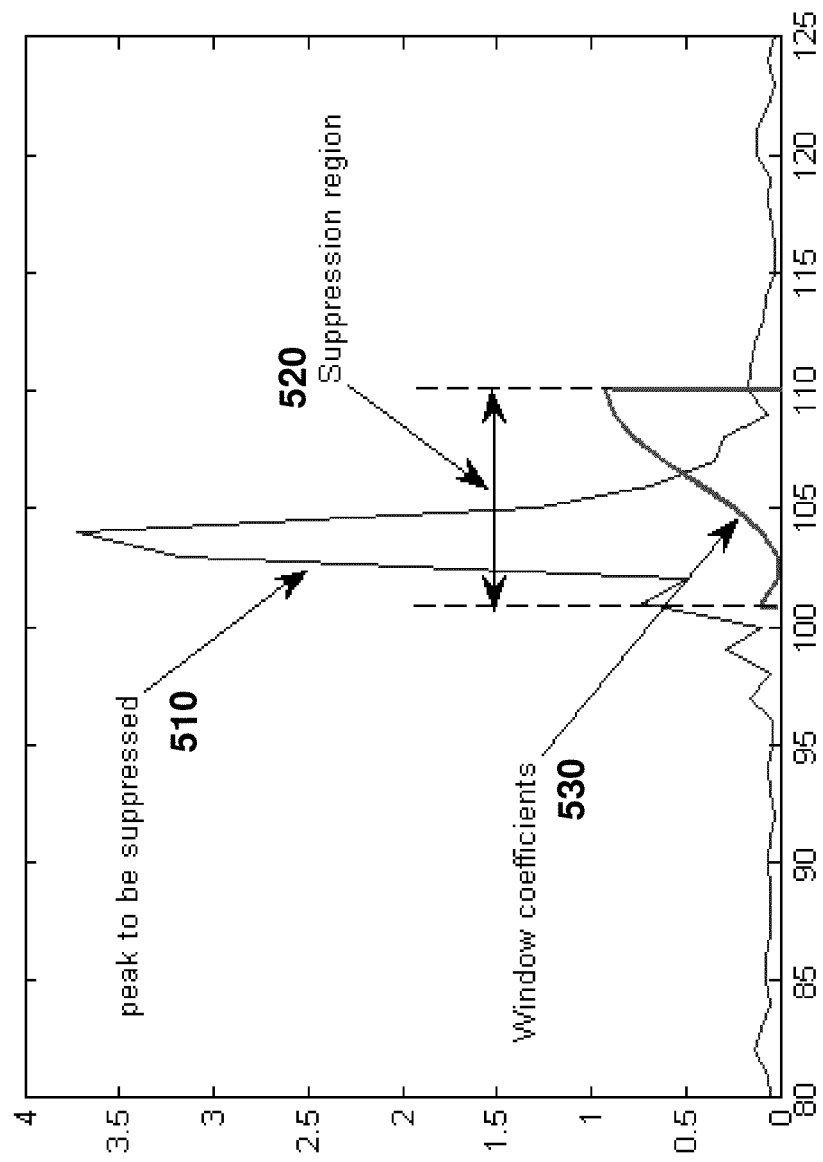
FIG. 5 illustrates, according to an embodiment of the present invention, a design of a second time-domain window function configured to suppress the spikes occurred in the neighborhood of the symbol boundaries after the received signal is filtered.

The second time-domain window function may also be designed based on a width of the spikes. As an example, this width may be obtained through simulation. In particular, the inventors have found that the spikes have a typical width depending on (1) a channel delay spread experienced by the received signal during signal transmission, and (2) the length of a filter used in the filtering of the received signal. FIG. 5 depicts an example illustrating a design of the second time-domain window function. It is desired to suppress a spike 510 in a filtered signal after decimation. A suppression region 520 is then identified for the second time-domain window function. In particular, the suppression region 520 is configured to cover the spike 510. The suppression region 520 is designed with window coefficients 530. During the time (i.e. on the samples) that the spike 510 is present in the suppression region 520, the window coefficients 530 (on the left part of the suppression region 520 in FIG. 5) have a relatively low value in comparison to 1 in order to suppress the spike 510. Thereafter, the window coefficients 530 gradually rise to unity (as seen on the right part of the suppression region 520 in FIG. 5). Apart from the design depicted in FIG. 5, the window coefficients 530 in the suppression region 520 may be configured to have other shapes. For example, the window coefficients 530 may be set to all zeroes.

Outside the suppression region 520, the second time-domain window function may have a value of 1. Multiplication by 1 implies that the filtered signal is kept unchanged. Therefore, the post-processing of the filtered signal may be implemented by performing spike suppression over a plurality of suppression regions and keeping the filtered signal unchanged outside the suppression regions.

A second aspect of the present invention is to provide an apparatus for detecting presence of a preamble in a received signal. In particular, the disclosed apparatus is configured to realize a process substantially based on the method disclosed above in the first aspect of the present invention.

The received signal has one or more frequency-multiplexed component signals received over a frequency range. The frequency range is subdivided into a random access channel and a non-random access channel. The received signal further includes temporal reference locations such that boundaries of transmitted symbols in the one or more component signals received over the non-random access channel are approximately time-aligned to the temporal reference locations.

Although the apparatus disclosed herein is illustrated with a focus on detecting presence of one preamble, an ordinary person skilled in the art can extend the disclosed apparatus for detecting presence of multiple preambles in the received signal according to the teachings disclosed herein.

Figure 6:
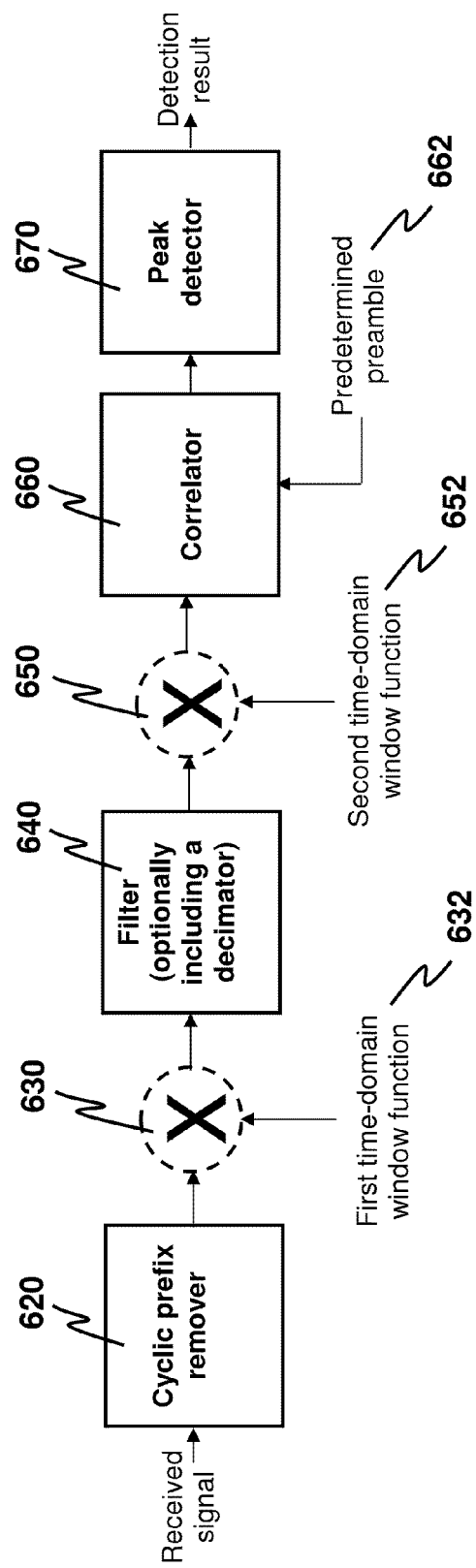
FIG. 6 depicts an apparatus for processing a received uplink signal in accordance with an embodiment of the present invention.

The disclosed apparatus is illustrated as follows with reference to FIG. 6. FIG. 6 depicts an apparatus in accordance with an embodiment of the present invention. An apparatus 600 for detecting presence of a preamble in a received signal comprises a filter 640 for filtering the received signal. The filter 640 yields a filtered signal comprising a substantial portion of the one or more component signals received over the random access channel without including a substantial portion of the one or more component signals received over the non-random access channel. The apparatus 600 further comprises a correlator 660 for correlating the filtered signal with a predetermined preamble 662 to thereby generate a plurality of correlation outputs. In addition, the apparatus 600 includes a first multiplier 630 for modifying the received signal before the received signal is filtered by the filter 640, or a second multiplier 650 for modifying the filtered signal after the filtered signal is obtained from the filter 640 and before the filtered signal is correlated by the correlator 660, or both of the first multiplier 630 and the second multiplier 650. The first multiplier 630 is configured to modify the received signal by multiplying the received signal with a first time-domain window function 632 that is configured to substantially smooth discontinuities present in the received signal at the temporal reference locations. The second multiplier 650 is configured to modify the filtered signal by multiplying the filtered signal with a second time-domain window function 652 that is configured to substantially suppress spikes present in the filtered signal in the neighborhood of the temporal reference locations.

Preferably, the apparatus 600 further comprises a peak detector 670 for detecting, among the correlation outputs obtained from the correlator 660, one or more peaks above a detection threshold value so as to detect presence of the preamble in the filtered signal and to estimate a timing advance of a UE that sent the preamble. The filter 640 may include a decimator configured such that the filtered signal has a sampling rate lower than the received signal's sampling rate. As mentioned above, subsequent processes can be simplified because of dealing with a smaller number of samples. An optional cyclic-prefix remover 620 may be included to remove a cyclic prefix in the received signal before the received signal is processed by the first multiplier 630 or the filter 640. Using the optional cyclic-prefix remover 620 has an advantage as it results in a smaller number of samples to be involved in subsequent processes.

Similarity between the apparatus and the method both disclosed herein lead to the following optional features for the disclosed apparatus. Preferably, the first time-domain window function 632 or the second time-domain window function 652 is substantially close to zero at any of the temporal reference locations. The first time-domain window function 632 or the second time-domain window function 652 may have a certain window shape. Examples of this certain window shape include a rectangular window, a Hamming window, a Kaiser window and a raised cosine window. The first time-domain window function is designed based on the width of a smooth region. The multiplying of the received signal with the first time-domain window function 632 may be configured such that multiplication is performed over a plurality of smoothing regions only and not outside the smoothing regions so as to yield a multiplier output, outside the smoothing regions, that is an original copy of the received signal. Each of the smoothing regions is located in the neighborhood of the temporal reference locations.

The second time-domain window function may also be designed based on a width of the spikes, as illustrated above with the aid of FIG. 5. As is mentioned above for the disclosed method, the post-processing of the filtered signal may be implemented by performing spike suppression over a plurality of suppression regions and keeping the filtered signal unchanged outside the suppression regions. In the implementation of the second multiplier 650 in the apparatus 600, the multiplying of the filtered signal with the second time-domain window function 652 may be configured such that multiplication is only performed over a plurality of suppression regions while multiplication is not performed outside the suppression regions so as to yield a multiplier output that is an original copy of the filtered signal, each of the suppression regions being located in the neighborhood of the temporal reference locations.

The transmitted symbols may be SC-FDMA symbols or OFDMA symbols.

The embodiments disclosed herein may be implemented using a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for detecting presence of a preamble in a received signal, the received signal having one or more frequency-multiplexed component signals received over a frequency range, the frequency range being subdivided into a random access channel and a non-random access channel, the received signal further having temporal reference locations such that boundaries of transmitted symbols in the one or more component signals received over the non-random access channel are approximately time-aligned to the temporal reference locations, the method comprising:

filtering the received signal so as to obtain a filtered signal comprising a substantial portion of the one or more component signals received over the random access channel without including a substantial portion of the one or more component signals received over the non-random access channel;

correlating the filtered signal with a predetermined preamble to generate a plurality of correlation outputs for detecting presence of the preamble in the filtered signal; and pre-processing the received signal before the received signal is filtered, or post-processing the filtered signal after the filtered signal is obtained and before the filtered signal is correlated, or performing both the pre-processing of the received signal and the post-processing of the filtered signal, wherein the pre-processing of the received signal includes modifying the received signal by multiplying the received signal with a first time-domain window function configured to substantially smooth discontinuities present in the received signal at the temporal reference locations, and wherein the post-processing of the filtered signal includes modifying the filtered signal by multiplying the filtered signal with a second time-domain window function configured to substantially suppress spikes present in the filtered signal in the neighborhood of the temporal reference locations.

2. The method of claim 1, further comprising:
detecting, among the correlation outputs, one or more peaks above a detection threshold value so as to detect presence of the preamble in the received signal and to estimate a timing advance of a user equipment (UE) that sent the preamble.

3. The method of claim 1, wherein the first time-domain window function or the second time-domain window function is substantially close to zero at any of the temporal reference locations.

4. The method of claim 1, wherein the multiplying of the received signal with the first time-domain window function is configured such that the received signal is modified by multiplying the received signal with the first time-domain window function if the received signal is inside a plurality of smoothing regions while the received signal is kept unchanged if the received signal is outside the smoothing regions, each of the smoothing regions being located in the neighborhood of the temporal reference locations.

5. The method of claim 1, wherein the multiplying of the filtered signal with the second time-domain window function is configured such that the filtered signal is modified by multiplying the filtered signal with the second time-domain window function if the filtered signal is inside a plurality of suppression regions while the filtered signal is kept unchanged if the filtered signal is outside the suppression regions, each of the suppression regions being located in the neighborhood of the temporal reference locations.

6. The method of claim 1, wherein the first time-domain window function or the second time-domain window function has a window shape that is one of a rectangular window, a Hamming window, a Kaiser window and a raised cosine window.

7. The method of claim 1, wherein the transmitted symbols include single-carrier frequency division multiple access (SC-FDMA) symbols or orthogonal frequency division multiple access (OFDMA) symbols.

8. The method of claim 1, wherein the random access channel is a physical random access channel (PRACH).

9. The method of claim 8, wherein the non-random access channel includes one or more of PUSCHs and PUCCHs.

10. An apparatus for detecting presence of a preamble in a received signal, the received signal having one or more frequency-multiplexed component signals received over a frequency range, the frequency range being subdivided into a random access channel and a non-random access channel, the received signal further having temporal reference locations such that boundaries of transmitted symbols in the one or more component signals received over the non-random access channel are approximately time-aligned to the temporal reference locations, the apparatus comprising:

a filter for filtering the received signal, yielding a filtered signal comprising a substantial portion of the one or more component signals received over the random access channel without including a substantial portion of the one or more component signals received over the non-random access channel;

a correlator for correlating the filtered signal with a predetermined preamble, generating a plurality of correlation outputs; and a first multiplier for modifying the received signal before the received signal is filtered, or a second multiplier for modifying the filtered signal after the filtered signal is obtained and before the filtered signal is correlated, or both of the first multiplier and the second multiplier, wherein the first multiplier is configured to modify the received signal by multiplying the received signal with a first time-domain window function configured to substantially smooth discontinuities present in the received signal at the temporal reference locations, and wherein the second multiplier is configured to modify the filtered signal by multiplying the filtered signal with a second time-domain window function configured to substantially suppress spikes present in the filtered signal in the neighborhood of the temporal reference locations.

11. The apparatus of claim 10, further comprising a peak detector for detecting, among the correlation outputs, one or more peaks above a detection threshold value so as to detect presence of the preamble in the received signal and to estimate a timing advance of a user equipment (UE) that sent the preamble.

12. The apparatus of claim 10, wherein the filter includes a decimator configured such that the filtered signal has a sampling rate lower than the received signal's sampling rate.

13. The apparatus of claim 10, wherein the first time-domain window function or the second time-domain window function is substantially close to zero at any of the temporal reference locations.

14. The apparatus of claim 10, wherein the multiplying of the received signal with the first time-domain window function is configured such that multiplication is performed only if the received signal is inside a plurality of smoothing regions while multiplication is not performed if the received signal is outside the smoothing regions so as to yield a multiplier output that is an original copy of the received signal, each of the smoothing regions being located in the neighborhood of the temporal reference locations.

15. The apparatus of claim 10, wherein the multiplying of the filtered signal with the second time-domain window function is configured such that multiplication is performed only if the filtered signal is inside a plurality of suppression regions while multiplication is not performed if the filtered signal is outside the suppression regions so as to yield a multiplier output that is an original copy of the filtered signal, each of the suppression regions being located in the neighborhood of the temporal reference locations.

16. The apparatus of claim 10, wherein the first time-domain window function or the second time-domain window function has a window shape that is one of a rectangular window, a Hamming window, a Kaiser window and a raised cosine window.

17. The apparatus of claim 10, wherein the transmitted symbols include single-carrier frequency division multiple access (SC-FDMA) symbols or orthogonal frequency division multiple access (OFDMA) symbols.

18. The apparatus of claim 10, wherein the random access channel is a physical random access channel (PRACH).

19. The apparatus of claim 18, wherein the non-random access channel includes one or more of PUSCHs and PUCCHs.

* * * * *